United States Patent [19]

Grime

[11] 3,811,701
[45] May 21, 1974

[54] RESTRAINING DEVICE FOR A VEHICLE PASSENGER

[75] Inventor: Geoffrey Grime, Swansea, England

[73] Assignee: Accles Britax Limited, Oldbury, Warley, Worcester, England

[22] Filed: July 18, 1973

[21] Appl. No.: 380,277

Related U.S. Application Data

[62] Division of Ser. No. 157,110, June 28, 1971, Pat. No. 3,764,159.

[30] Foreign Application Priority Data

June 30, 1970 Great Britain .................. 31637/70
Jan. 11, 1971 Great Britain .................... 1186/71

[52] U.S. Cl. ............................ 280/150 B, 297/386
[51] Int. Cl. ............................................ B60r 21/10
[58] Field of Search ................. 280/150 B; 297/386

[56] References Cited
UNITED STATES PATENTS

| | | | |
|---|---|---|---|
| 2,499,993 | 3/1950 | Gregg | 280/150 B |
| 2,708,555 | 5/1955 | Heinemann | 280/150 B X |
| 2,749,143 | 6/1956 | Chicka | 280/150 B |
| 2,833,554 | 5/1958 | Ricordi | 280/150 B |
| 3,237,729 | 3/1966 | Proctor | 297/386 X |
| 3,431,019 | 3/1969 | Lewis et al. | 297/386 |
| 3,524,678 | 8/1970 | DeLayenne | 280/150 B X |
| 3,583,530 | 6/1971 | DeVenne | 297/386 X |
| 3,666,198 | 5/1972 | Neuman | 297/386 X |
| 3,764,159 | 10/1973 | Grime | 280/150 B |

FOREIGN PATENTS OR APPLICATIONS

| | | | |
|---|---|---|---|
| 264,159 | 4/1967 | Australia | 280/150 B |
| 1,923,312 | 5/1969 | Germany | 280/150 B |
| 1,245,452 | 9/1971 | Great Britain | 280/150 B |

*Primary Examiner*—Leo Friaglia
*Attorney, Agent, or Firm*—Baldwin, Wight & Brown

[57] ABSTRACT

A restraining device to restrain an occupant of a vehicle. The device may be a pad or belt attached to a member movable alongside the occupant's seat between an operative position where the pad or belt is adjacent the occupant's chest and an inoperative position spaced from the occupant's chest. The member is either slidable or pivotable and preferably attached to inertia locking means and a device for absorbing forward momentum of the occupant on deceleration of the vehicle. The member can be automatically positioned in its operative position when the vehicle is occupied or used whereby a passive restraint is provided.

19 Claims, 17 Drawing Figures

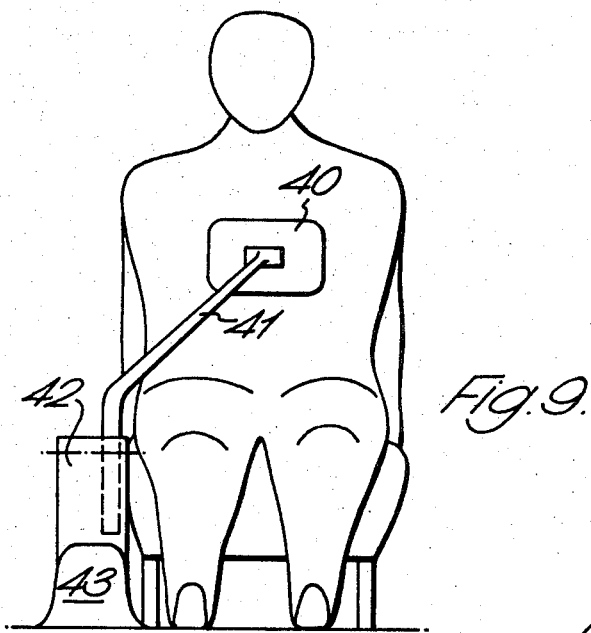
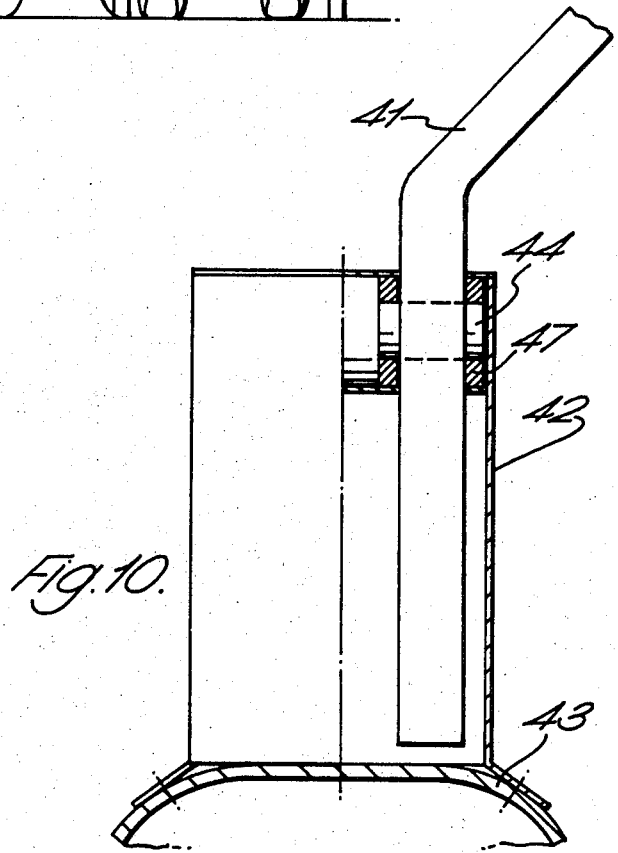

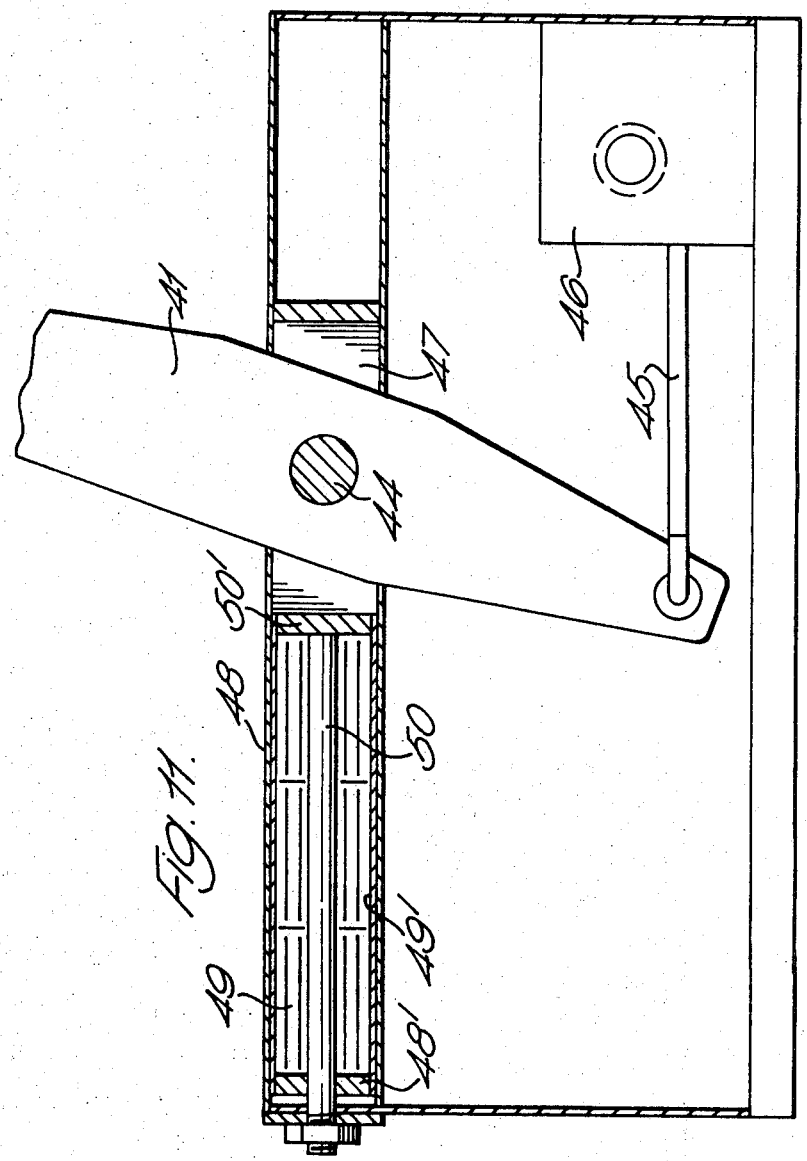

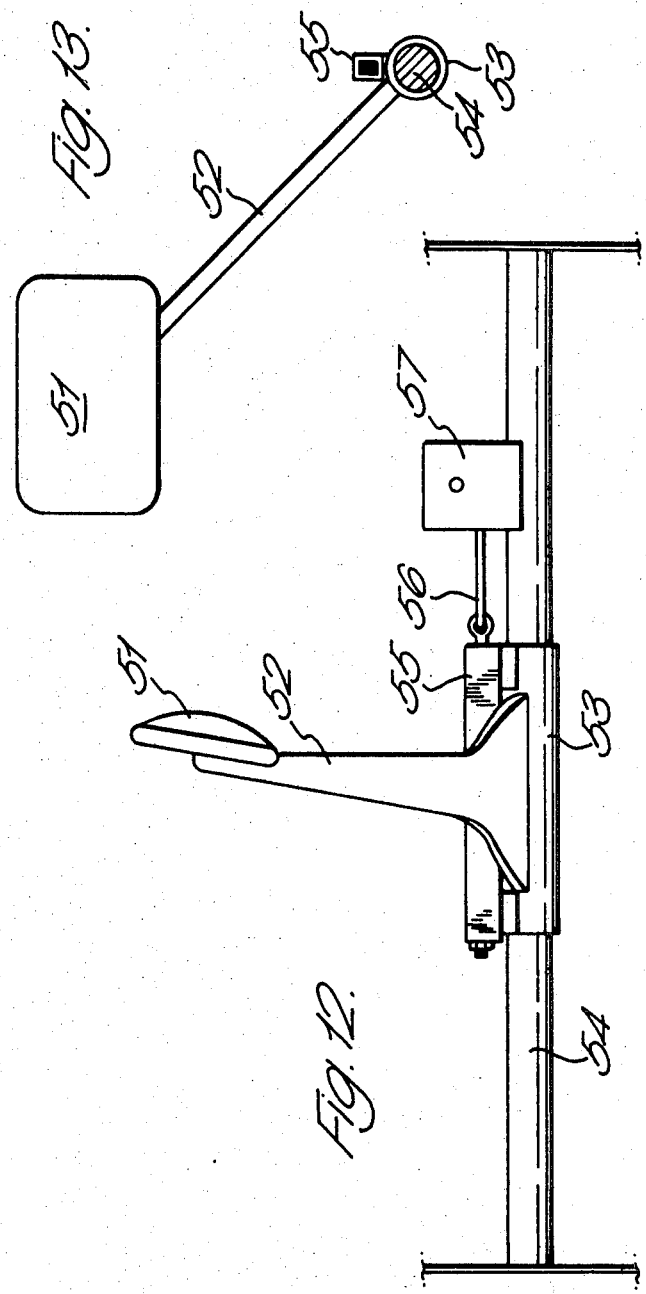

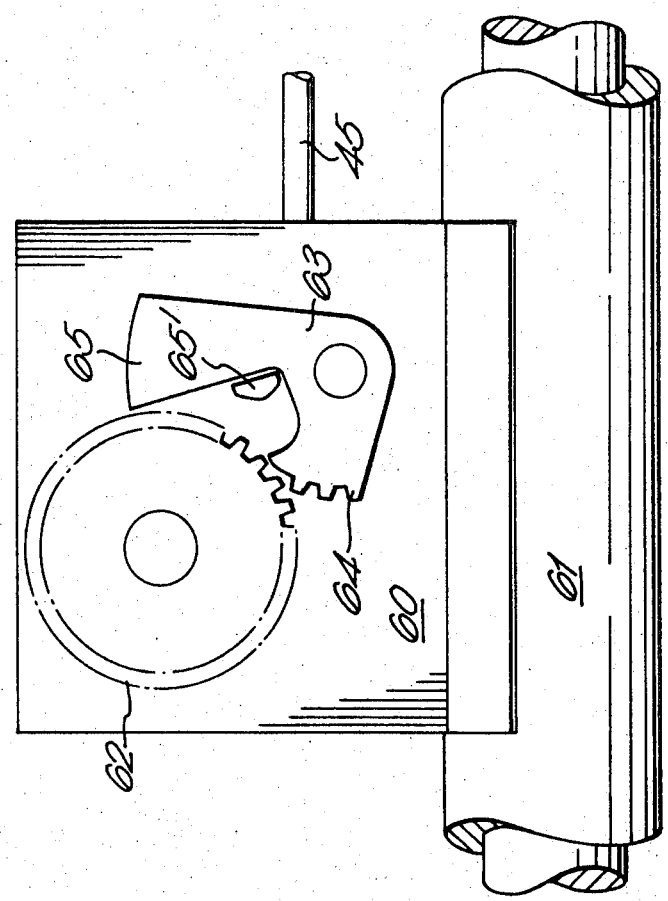
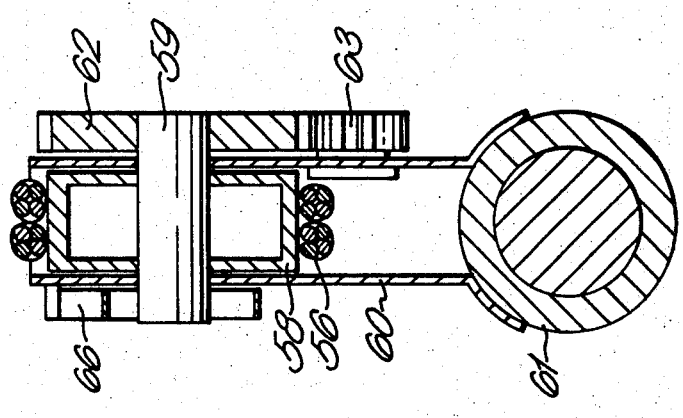

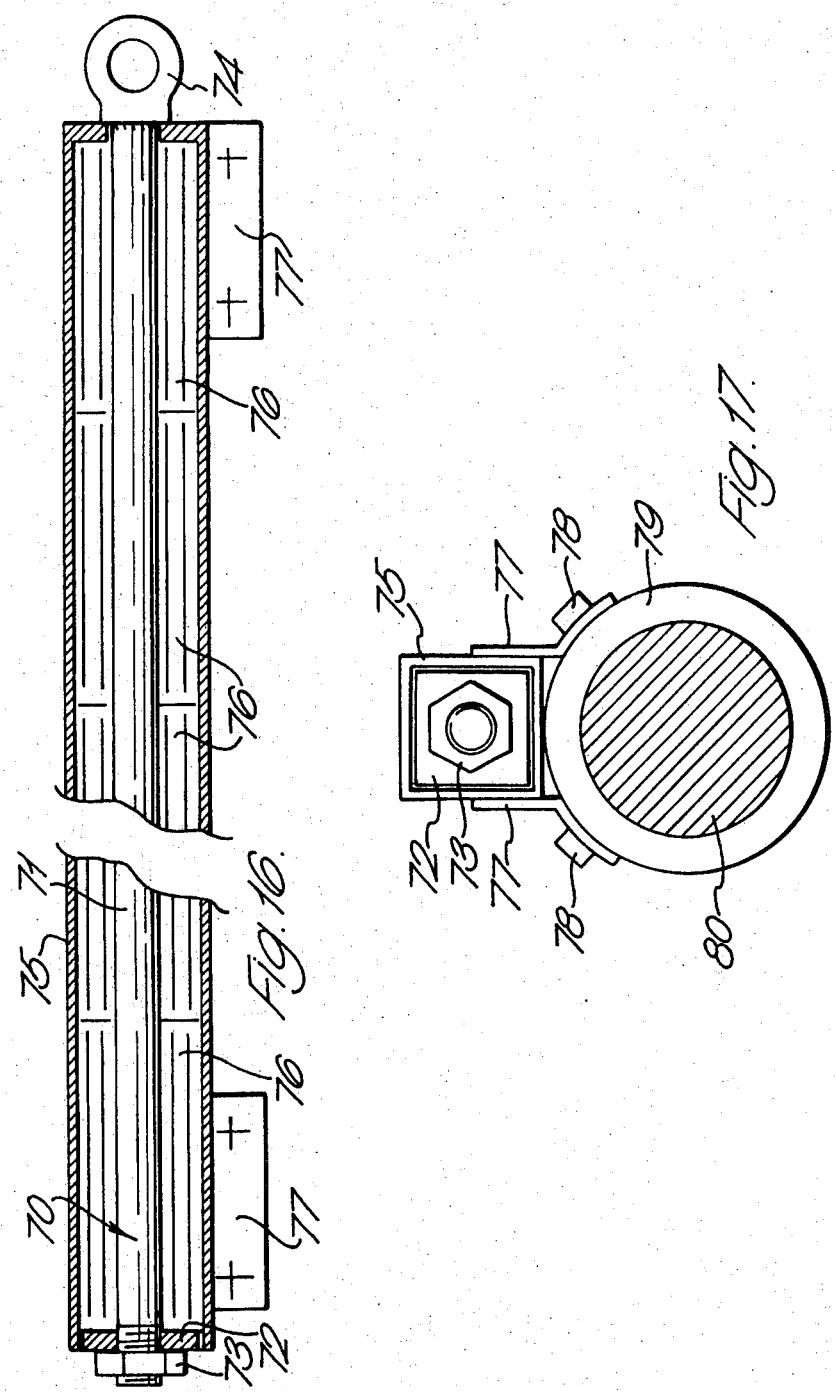

RESTRAINING DEVICE FOR A VEHICLE PASSENGER

This is a divisional application of application Ser. No. 157,110, filed June 28, 1971 and now U.S. Pat. No. 3,764,159.

This invention relates to a restraining device for holding an occupant in his seat in a vehicle, in the event of the vehicle being involved in a collision or otherwise undergoing abrupt deceleration. In the context of this Specification the term "vehicle" is used generically to include not only land vehicles (e.g. motor cars) but also air and water craft.

Known restraining devices include e.g. safety belts which are placed in position by a seated occupant of a vehicle. However so-called "passive" systems are also known whereby a restraining device is automatically placed in the correct position when a person occupies a vehicle.

Some known passive systems depend for example, on closure of a vehicle door whereby a bar or strap is automatically positioned before a seated occupant. Such latter systems are not comfortable because, when the vehicle door is closed, the safety device is fixed in position and it cannot be pushed away from the user without opening the door. Whilst the "passive" restraint exercised by the bar or strap benefits the user in e.g. a vehicle collision, should the vehicle door become damaged and unopenable the user may only be able to extricate himself with great difficulty.

It is also known to provide a restraining device for a vehicle occupant which is stored e.g. beneath the dashboard of a car whilst the vehicle is in motion, and on sudden deceleration is automatically brought into position before the user. Such a device has the principal disadvantage of not moving into its operative position fast enough to restrain ejection of the user from his seat when the vehicle collides with an obstacle at high speed. If such a restraining device employs a ram or push rod extending forwardly of the user, and such a device is fixed in position before the vehicle is mobile, the users movements are restricted.

The present invention seeks to overcome the disadvantages of the known devices and to give the user a greater freedom of movement whilst being so positioned as to be a clear reminder to the user to place it before him before travelling. In a preferred embodiment a pad is positioned before the user's chest before the vehicle moves, the pad being connected to a member which is coupled to either inertia locking means or means responsive to vehicle acceleration or deceleration automatically to lock the pad in its operative position. In another embodiment a restraining device, which can be either a pad or a diagonal belt, is automatically placed in an operative position before the check of a user before the car moves. This automatic device is connected to a member which is coupled to either inertia locking means or means responsive to vehicle accleration or deceleration to lock the device in its operative position. Both of these preferred embodiments allow a great deal of freedom to the user whilst maintaining his safety.

The present invention provides apparatus to restrain movement of a seated occupant in a vehicle comprising a restraining device to act against the chest of the seated occupant, which device is supported laterally by a member movable alongside the occupant's seat between an operative position where the restraining device is positioned adjacent the chest of the seated occupant and an inoperative position where the restraining device is spaced from the chest of the seated occupant and releasable locking means to lock said movable member in said operative position whereby the restraining device is positionable adjacent the chest of the seated occupant before the vehicle moves and is releasable before the occupant vacates his seat.

Upon being locked said member need not be rigidly held against forward movement, but it may be so mounted that when a predetermined force is developed at the restraining device, the member swings forward a limited amount either at constant load or load increasing with distance of movement. In other words, the member is preferably coupled to an energy absorption device which absorbs the forward momentum of an ejected passenger at a predetermined rate. When such an energy absorption device is used the member must be locked in its operative position and whilst this may be achieved by a manually releasable catch, preferably inertia locking means or locking means responsive to accelerational forces exerted by the vehicle is employed. Examples of energy absorption devices are braking mechanisms wherein e.g. a disc brake acts on a rotatable or slidable member, or a member acts on compressible material such as an aluminium honeycomb.

Examples of the invention are described with reference to the accompanying drawings in which.

Figure 5:
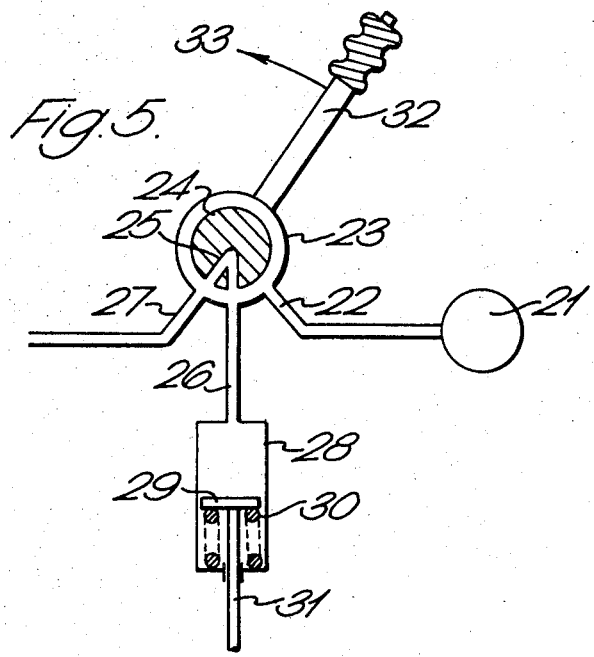
Figure 8:
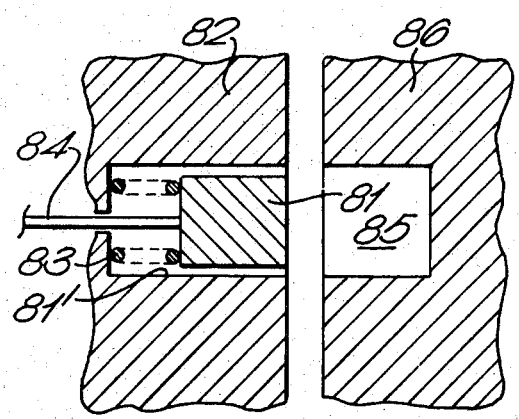
Figure 7:
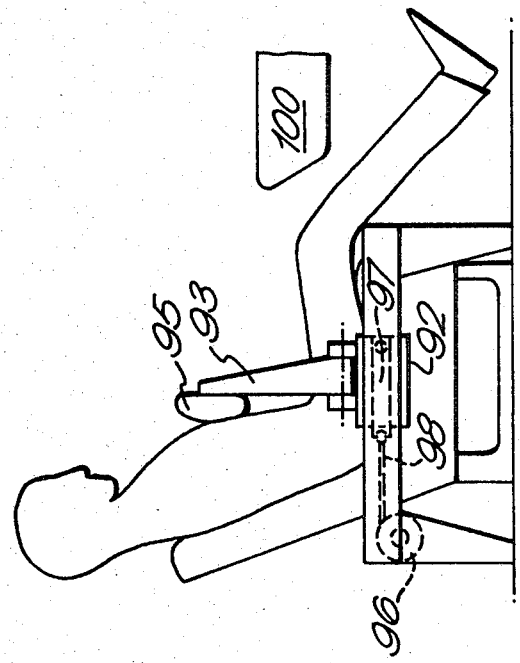
Figure 6:
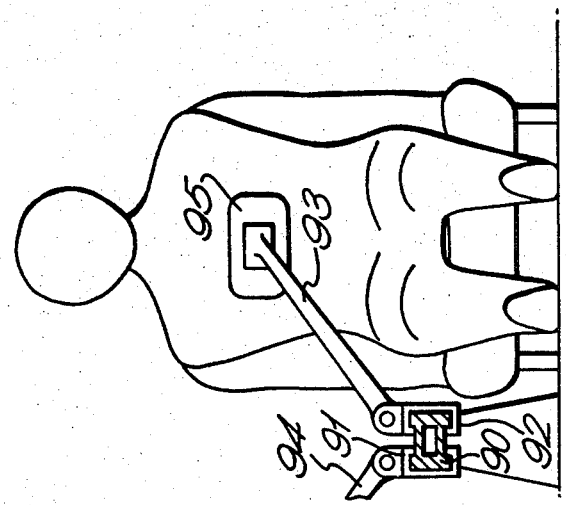

FIG. 5 is a circuit diagram illustrating apparatus for controlling a restraining device, FIGS. 6 and 7 illustrate a restraining device, FIG. 8 illustrates a locking device, FIG. 9 illustrates a restraining device supported on a member which is mounted on a transmission tunnel of a car, FIGS. 10 and 11 are respectively front and side views of the member rotatably mounted on a transmission tunnel which houses both a force control and a check device, FIGS. 12 and 13 respectively illustrates end and front views of a restraining device on a member mounted on a slidable carriage which is coupled to a check device, FIGS. 14 and 15 are respectively rear and side views of a check device and FIGS. 16 and 17 are respectively side and end views of a force control device.

Figure 2:
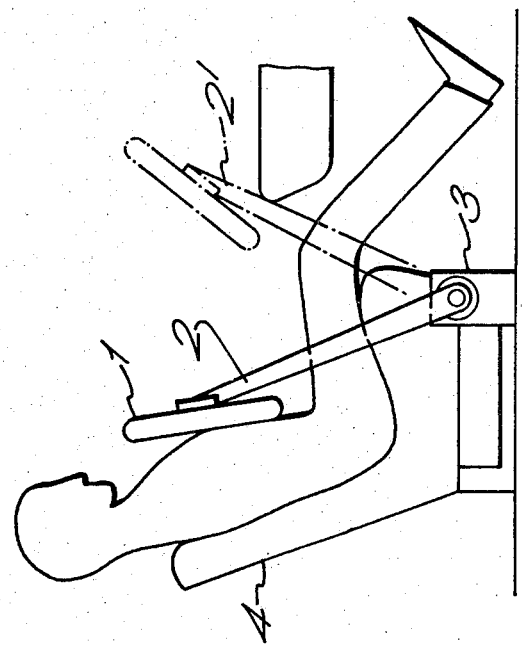
FIG. 2 shows a side view.
Figure 1:
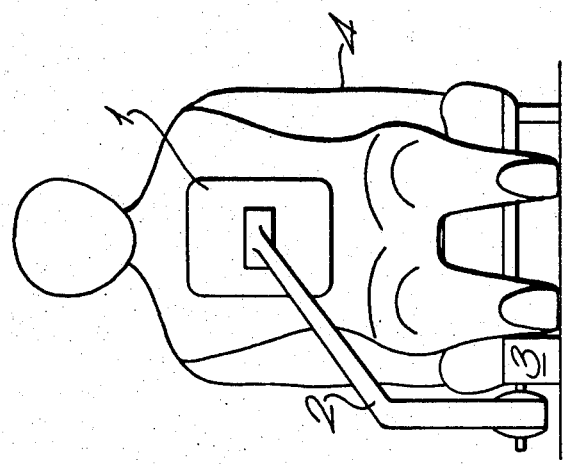
FIG. 1 shows a front view of a restraining device mounted in a vehicle.

Referring to FIGS. 1 and 2, a restraining device in the form of a pad 1 is mounted on the upper end of a member or cranked swing arm 2 the lower end of which is pivotally mounted to releasable locking means 3 firmly attached to the floor of the vehicle or to the passenger seat 4. In the latter case the seat 4 clearly would be of a suitable load bearing construction.

The pad 1 may be rigidly attached to the arm 2, or rotatably mounted on the arm 2 to rotate a limited amount for example, plus or minus 10° about a horizontal axis, rotation being against the bias of a spring tending to restore the pad to a normal position of rest. The pad 1 may have a variety of constructions, for example it may comprise a metal backing plate, ribbed for increased strength, and faced on the side presented to the seat occupant, with a covering of thick (for example 1 inch) resiliently deformable material such as expanded polyvinylchloride having an initial stiffness, per square inch, of about 10 lbs/2 in. For safety sake the covering of resiliently deformable material would be wrapped round the edges of the metal plate.

Figure 4:
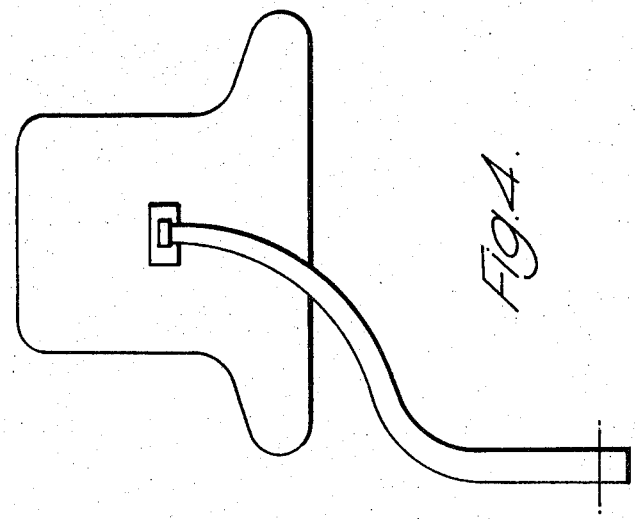
FIG. 4 shows a first view of an alternative embodiment.

In FIG. 1, the pad is shown of rectangular outline and it is envisaged that such a pad would be suitable to restrain the driver of a motor vehicle in his seat, whilst leaving ample freedom of movement for the drivers' arms. In FIG. 4, there is shown an alternative construction of pad which has an elongated base and it is envisaged that such a pad would be suitable to restrain the front seat passenger of a motor car in his seat. By providing a pad with a base of increased width, there would be no restriction of freedom of movement of the arms of the front seat occupant and the increased width of the face would give the additional protection, in the event of vehicle roll over, of bearing against the abdomen and thighs of the seat occupant, restraining him in his seat.

The pad preferably has an area of at least 40 square inches to avoid excessive concentration of pressure on the chest. A suitable size is a 9 inch by 5 inch rectangle but other shapes may be used as explained above. Forward movement of the lower part of the body can be controlled by a yielding structure such as thick padding placed on that part of the car struck by the knees in a frontal impact. This structure or knee pad (such as pad 100 shown in FIGS. 2 & 7 should preferably have a stiffness such that a force of about 1,000 lbf is required for an object which has the shape of one knee to depress the structure to a depth of 6 inches.

Whilst FIGS. 1 and 2 illustrate a member in the form of a cranked swing arm 2, the member may be slidable fore and aft of the vehicle as will be explained in detail in other embodiments described below. As shown in FIG. 4 the member e.g. swing member 2 may be curved instead of having an angled configuration as shown in FIG. 1.

The pad and swing arm 2 are shown in their operative positions in FIGS. 1 and 2, with the pad in front of the chest of the seat occupant. In their inoperative positions, the arm is swung forward into the position indicated by the dotted lines 2', in FIG. 2, allowing the occupant free entry to and exit from the seat 4. In the operative position the pad may bear against the chest of the seat occupant or, preferably, would be spaced a small distance of 1 to 2 inches from the chest. This would avoid any physical discomfort to the occupant which might occur in the case of the pad constantly bearing against the occupants chest.

The arm 2 is mounted at its lower end on a rotatable shaft provided with locking means or latching mechanisms to lock the shaft with the arm in its operative position and in its inoperative position. The latch, locking the shaft with the arm in its inoperative position, may be manually releasable, but for the sake of safety, the latch would be suitably connected to a device whereby it is automatically released when a passenger is seated in the vehicle, or when some part of the vehicle is operated before it is driven.

Automatic release could be achieved by a switch connected to an ignition circuit, or functional parts of the vehicle such as its brakes or gearbox, or the engine whereby such release depends on response of engine oil pressure or manifold induction, or a switch on a speedometer, the switch being actuated on exceeding a predetermined low speed (e.g. 5 m.p.h.), or by a pressure sensitive switch in the seat 4.

When the latch mechanism is released automatically, the arm swings forward towards the occupant, under suitable biasing means, into its operative position.

Instead of automatic release locking means, the vehicle could be rendered in an undriveable condition unless the member carrying restraining devices was locked in its operative position, e.g. by open circuiting an ignition circuit controlling brakes or a gearbox, or rendering the engine inactive.

With the foregoing arrangement the arm is permanently held in its operative position, with the pad bearing against or spaced slightly in front of the chest of the seat occupant. Movement of the seat occupant would therefore be very restricted and it may be desirable or necessary to arrange for the arm to be capable of forward movement, against suitable biasing means, under normal conditions of driving the vehicle, with an inertia actuated mechanism, sensitive to sudden change of movement of the vehicle or sudden forward movement of the arm, rapidly to lock the arm. Thus the seat occupant would be free to bend forward, pushing the arm forward with him, but in the event of a collision or accident the arm would be locked against further forward movement.

Figure 3:
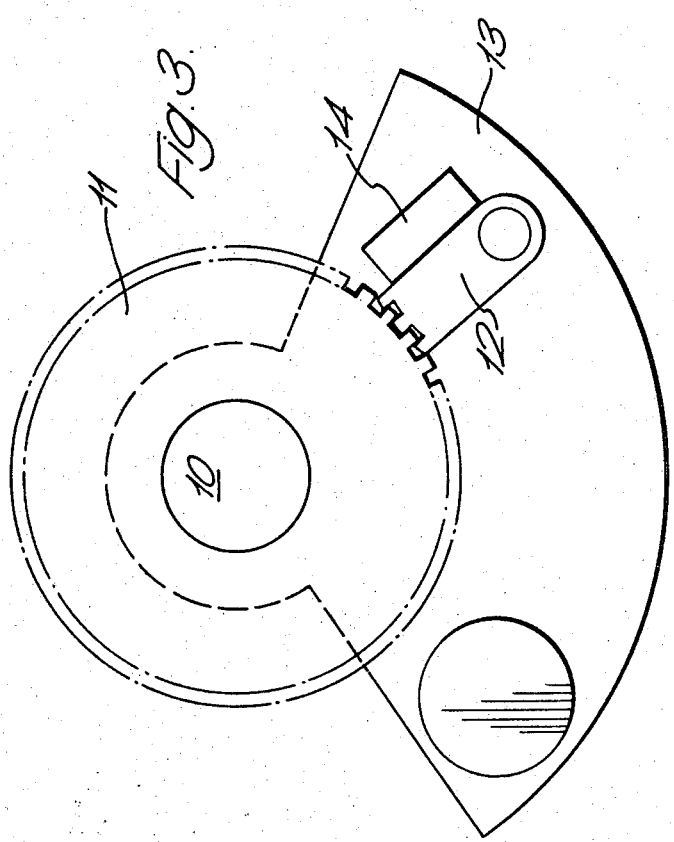
FIG. 3 shows, in part, a detail of an inertia actuated locking means.

FIG. 3 shows an inertia locking means whereby the arm (not shown) is rotatably mounted on a fixed shaft 10 and rigidly attached to the arm, concentric with the shaft 10, is a ratchet 11. A locking pawl 12 is pivotally mounted on a plate 13 carrying an abutment stop 14. Under normal conditions the locking pawl 12 is out of engagement with the ratchet 11 so allowing the arm to pivot about the shaft 10 against the bias of the spring (not shown). In an emergency, the locking pawl 12 would be lifted into engagement with the ratchet 11 and upon coming up against the abutment stop 14, would lock the ratchet and hence the arm against further rotation around the shaft 10. Lifting of the locking pawl 12 into engagement with the ratchet 11, could be achieved by a variety of different mechanisms, for example conventional ball and saucer mechanisms or a pendulum such as is known with inertia locking mechanisms of safety belts. If the plate 13 is fixed, then the arm will be locked and held firmly against further forward swinging movement. In certain circumstances it may be desirable to arrange for the arm, upon being locked, to be capable of further limited forward movement, upon a predetermined force being developed at the pad. This can be achieved by having the plate 13 as a sector of a disc brake freely rotatable about the shaft 10 but held against rotation by a pair of brake discs, sandwiching the plate. With such an arrangement, depending upon the gripping pressure of the brake discs, the disc sector would be held against pivotal movement, about the shaft 10, until a predetermined force was developed at the pad, whereupon the disc sector would slip between the pair of brake pads until it came up against a stop (not shown). Furthermore by increasing the thickness of the disc sector in its direction of movement relative to the brake pads, then the resistance of movement of the arm would increase with distance.

It has already been described that a mechanism can be provided to lock the arm in an inoperative position. The mechanism can be a latch mechanism released by a solenoid when the occupant gets into the seat. With just one switch, closed when an occupant is in the seat, the circuit of the solenoid will always be closed when the occupant is in his seat, so that when the occupant wishes to get out of the seat the latching mechanism will not function to hold the arm in its inoperative position. This can be overcome by providing a second switch in the circuit of the solenoid which switch is opened when the door of the car is opened. Thus to leave the vehicle the occupant pushes the arm forward out of the way, into its inoperative position, and opens the car door. The circuit of the solenoid is thus opened and the latch operative to hold the arm in its inoperative position. When the occupant gets into the car a seat actuated switch is closed and then when the door is closed the second switch also is closed so closing the circuit of the solenoid to withdraw a latch, releasing the arm to move automatically into its operative position.

In an alternative embodiment, the swing arm may be attached to a conventional inertia locking mechanism, sensitive to sudden vehicle movement or reel acceleration, by a flexible tension member, i.e. a wire or webbing, extending from the reel, of the locking mechanism, to the swing arm. The point of attachment of the tension member to the swing arm would be spaced as far as possible from the pivot of the arm. If desired, the tension member may include a yielding link, to allow the tension member to extend and hence the swing arm to move forward a controlled amount, when a predetermined force is developed at the pad.

Referring to FIG. 5, a fluid pressure or vacuum generator 21 is connected by a pipe 22 to a three-way valve 23. The three-way valve comprises a rotatable core 24 in which a V-shaped passageway is located. Passageway 25 may connect either pipes 22 and 26, or 26 and 27.

Pipe 26 is connected to a fluid cylinder 28 housing a movable piston 29 which reacts against the bias of a spring 30. The piston 29 is attached to a connecting rod 31 to control or operate a member (not shown) attached to a restraining device (not shown) and/or door lock (not shown) as explained below.

Pipe 27 is connected for example, to the oil sump of an engine when the generator 21 is an engine oil pump, or is a vent to atmosphere when the generator 21 is of air pressure or a vacuum. In the latter case, the spring bias 30 must be reversed.

The rotary core 24 is connected by a shaft (not shown) to a handbrake 32. In the position shown, the handbrake 32 is on and pipe 26 is in fluid communication with the vent pipe 27. The piston is then at the extent of its travel due to the spring bias 30. The handbrake is movable in the direction of the arrow 33 to release the brakes whereupon pipes 22 and 26 are connected whereby the piston moves against the spring bias 30 under fluid pressure. The member (not shown) to which a restraining device is attached is then operated or controlled by movement of push rod 31.

The apparatus described with reference to FIG. 5 is an example which maintains a restraining device in its operative position whenever the engine is running, and when the engine stops and the pressure drops to zero, the restraining device is free to move from its operative position. The restraining device will remain in an operative position until the person protected removes it. In this case, the push rod disengages a locking means which locks the member supporting the restraining device in its operative position.

Alternatively, a restraining device can be moved into position by the action of piston 29, the push rod 31 being either mechanically connected, or connected to operate an electrical device such as a solenoid and/or an electrical motor to achieve such movement.

Referring to FIGS. 1 and 2, a swing arm 2 is free to be pushed forward until it almost touches the dashboard. At the same time, the arm 2 engages a spring catch to retain it in this forward position. This allows the person access to move within the vehicle and if need be, alight therefrom.

With the person seated in the vehicle, as soon as the engine is started, the holding catch is withdrawn by push rod 31 and the arm 2 automatically returns to its operative position. Alternatively, the arm 2 may be forcibly returned to its operative position by fluid pressure acting on another piston.

The latter alternative is particularly well suited to place a single diagonal belt or the diagonal belt of a lap-and-diagonal belt in position. An automatic reel, with either a webbing-sensitive or vehicle-sensitive lock is placed at one end of the belt normally, but not necessarily, at the lower end. The upper end of the belt is attached to a strong carrier which travels in or on a slide. By way of example, the slide may be 18 inches long and fixed in a fore and aft direction above the driver's window. When the engine is not running and there is no fluid pressure, the carrier is at the front end of the slide and the belt allows easy access for the driver. When the engine is running, fluid pressure operates push rod 31 or an electrical motor, to force the carrier to move to the other end of the slide and engage a strong catch retaining it in that position. When the engine stops, or the handbrake 32 is pulled on, fluid pressure drops and the carrier is moved by spring bias into the forward position.

As another alternative, to allow the driver or passengers to alight without stopping the engine, an electrical switch could be fitted to the handbrake so that when the brakes are applied, a solenoid operated valve releases the pressure or vacuum or in the case of an all-electric system, the switch itself maintains the ignition circuit, and the restraining device is either free to be moved into an inoperative position, or is so moved.

An alternative method of providing the necessary travel for the chest restraining pad is to attach the arm carrying the pad to a sliding member or carriage which can travel on a horizontal rail fixed rigidly at an appropriate height above the floor or attached to the door, the roof, or the side of the car.

A general arrangement of the system to provide protection for passenger and driver is shown in FIGS. 6 and 7, although details are only given for the passenger restraint. A rail 90 has a rectangular box section, and has sliding carriages 91 and 92 on both sides, one attached to a member 93 supporting a passenger's restraint pad 95, and the other attached to member 94 supporting a driver's pad (not shown). The members or arms 93 and 94 are pivoted at their lower ends so that they may be parked when not in use, but this is a refinement which may be unnecessary, in which case the arms would be attached rigidly to their carriages 91 and 92.

A retracting and locking mechanism 96 and a device 97 which controls the force at which the pad 93 moves forward are indicated in the side view in FIG. 7. The locking and retracting mechanism 96 may be similar to that used in automatic seat belts, and is connected by a wire or cable 98 to the sliding carriage 92 through load control device 97, which may, for example, be a piece of tear webbing, undrawn nylon, or a device for compressing aluminium honeycomb.

For a centrally mounted restraint system a rectangular box-section rail has the advantage that the passenger's and driver's restraint arms 93 and 94 are easily mounted on the same rail. However, a solid or hollow round-section rail has advantages wherever a separate rail is used for each restraint, since the sliding carriage may take the form of a close-fitting cylinder enclosing the rail, and this may be smaller and lighter than that required for a rectangular rail. To prevent unwanted rotation of the carriage in one arrangement, a slot may be cut in the rail, into which a peg attached to the carriage projects. The arm carrying the pad is rigidly attached to the carriage, and a suitable parking position for the pad is then easily provided by displacing the slot sideways when the arm and carriage have been pushed forwards beyond their operating range.

The arrangement of a sliding carriage on a rail is particularly advantageous for a door-mounted restraint, since the rail may extend over the whole width of the door, allowing ample room for a long slider and control mechanism. It also strengthens the door itself against side impacts.

It is desirable that a door mounted restraint should be provided with a quick-release mechanism whose actuator is visible from outside the car, for example, it might be placed on the window ledge close to the door lock. The release might be a pull knob attached by Bowden cable to a hook which, when operated, pulled the locking pawl out of engagement with the pinion wheel on a Britax-type emergency locking retractor.

Referring to FIG. 8, a safety door lock comprises a spring loaded tongue 81 housed in a recess 81' in a door frame 82. The spring loading is by a tension spring 83 normally biased to return the tongue 81 within the recess 81'. The tongue 81 is extended from the recess 81' by a push rod 84 operated either directly or indirectly by the push rod 31 of the apparatus described with reference to FIG. 5. A door 86 houses a recess 85 in which the tongue can extend.

Essentially the lock is burst proof on impact of the vehicle in a collision. When the generator 21 (FIG. 5) is the oil pump of an engine, whilst the engine is running the tongue 81 extends into the recess 85 to lock the door. When the engine is switched off, the pressure drops and the tongue is automatically withdrawn by the spring 83 into the recess 81'. A fluid pressure or vacuum generator may be directly connected to operate tongue 81 but this would have the disadvantage that occupants of the vehicle could not alight unless the fluid pressure is released, e.g. when the engine is switched off, pressure generated from an oil pump, or vacuum generated from the induction manifold, is released. However, in this case automatic locking of the door can be overriden by connecting the pressure or vacuum line through a handbrake operated device such as shown by FIG. 5. When the handbrake is applied the pressure or vacuum will then be released to enable the door to be opened. For extra convenience an additional override can be by way of an electrical push-button switch operating a solenoid to release pressure or vacuum whilst the engine is running. The switch may be conveniently sited on the dashboard for easy access to the driver.

Fluid pressure or vacuum operated cylinders may be combined with a switched electrical circuit for example, part of the ignition circuit of the vehicle, to increase the safety of the occupants. The arrangement can be such that the ignition circuit of the vehicle is only complete when a restraining device is in its operative position.

Various modifications are possible such as fixing the member (attached to a chest pad) to an arm connected to a sliding carriage moving on a rail fixed rigidly to the floor of the vehicle on the out-board side of the seat (although a rail in-board of the seat is preferable). Similarly, the arm may be attached to sliding rail arrangement situated in the roof of the vehicle to provide a kind of rigid diagonal belt. This would be expected to give additional protection if the vehicle over turns. A constant yield mechanism such as a linear brake or a disc can be attached to the restraining device to cushion impact of the person protected against the restraining device when the vehicle is in collision. A simple constant yield device for a pivoting arm can be provided by making the lower end of the arm, near the pivot, weak in the forward direction. The arm then deforms plastically in that direction at the required load on the pad.

As mentioned above the member on which the restraining device is mounted can be fixed in its operative position by locking means which is automatically operated. Such locking means can be operatively connected to a generator of fluid pressure or vacuum such as engine oil pressure or manifold induction.

FIG. 9 shows a restraining device in the form of a chest pad 40 connected to a member or cranked arm 41 which is rotatably mounted in a housing 42 over a tranmission tunnel 43 of a car. Transmission tunnel 43 could be enlarged to dispense with housing 42. Referring to FIGS. 10 and 11 arm 41 is rotatably mounted on a shaft 44 passing through a carriage member 47. Carriage member 47 is slidable in a tubular housing 48 of rectangular cross section. Arm 41 extends beyond shaft 44 to a linkage such as a cable 45 which is connected between the lower end of the arm and to a check device 46. Check device 46 is either inertia locking means or a device responsive to accelerational forces exerted by the vehicle to lock the arm 41 in its operative position (whereby clockwise rotation of arm 41, as viewed in FIG. 11, is prevented). Housing 48 contains an aluminium honeycomb 49 and a rod 50 having a piston member 50' fixed at one end. The other end of rod 50 is secured to a frame member by a nut. A sleeve 49' is fixed at one end to carriage member 47 and has an apertured disc 48' at its other end. In for example, a vehicle collision, carriage member 47 is carried forwards (to the right-hand side of the drawing) within housing 48. Apertured disc 48' then slides down rod 50 compressing the honeycomb 49 to exert a retarding force on arm 41.

FIG. 12 illustrates a restraining device attached to a member which is slidable fore and aft of a vehicle. A chest pad 51 is attached to an arm 52 mounted on a sliding carriage 53. Carriage 53 is slidably mounted on a track e.g. a round bar or tube 54. The track may be fixed in the transmission tunnel of the vehicle or in a housing on the transmission tunnel, or on the vehicle door or even within the vehicle door.

Arm 52 is operatively connected to a force control device 55 such as that shown in FIGS. 11 or 16. The carriage 53 is coupled by means of cable 56 to a check device e.g. inertia locking means 57.

The check device or inertia locking means 57 is shown in greater detail in FIGS. 14 and 15. Referring to FIG. 14 a cable drum 58 is rotatably mounted on a shaft 59 supported in a frame member 60 which is fixed to a support or tube 61. A few turns of cable 56 are shown in section on drum 58. A pinion wheel 62 mounted on one end of shaft 59 engages a two-armed lever 63 rotatably mounted on frame member 60. Lever 63 is generally L-shaped and has a toothed sector 64 for engagement with the teeth of pinion 62. Sector 64 is counterweighted by an upper part 65 which when, e.g. the vehicle decelerates is rotated clockwise and toothed sector 64 engages and locks pinion 62 to prevent unwinding of cable 56 from drum 58. Stop means 65' prevents contact between part 65 and the pinion 62 and abuts the leading edge of sector 64 to aid in locking pinion 62. Lever 63 can be biased so that part 65 rotates clockwise when a predetermined accelerational force is exceeded.

On the other side of shaft 59 is retracting spring 66 having one end fixed to shaft 59 and the other end fixed to part of frame member 60. Spring 66 provides a return force for cable 56 when it is unwound from drum 58.

A vehicle occupant confronted by chest pad 51 can move the pad forward by means of carriage 53 and track 54 but if the occupant is thrown forwards as in a vehicle collision, the pad is locked in position to restrain his forward movement.

FIGS. 16 and 17 show a force control device in greater detail. In FIG. 15, a piston 70 includes a rod 71 to one end of which is connected an apertured disc 72 secured by a nut 73. An eye 74 is attached to the other end of rod 71 whereby the rod 71 is connected to the member supporting e.g. a chest pad. Piston 70 is contained by a housing 75 of for example, square cross section. Housing 75 contains an aluminium honeycomb formed by five sections or slices 76. Housing 75 is fixed to mounting lugs 77 which are attached by means of bolts 78 to a sliding carriage mounted on a track 80. In FIG. 17 the carriage 79 is of circular cross section and the track 80 is a cylindrical bar. In operation, disc 72 moves through housing 75 compressing the honeycomb sections 76 thereby exerting increasing retarding force on a member attached to a pad.

It is possible to fit a force controlling device at e.g. pivot 44 of FIG. 10, in place of the sliding force control devices described above.

With a chest pad, a minimum of 8 inches movement is preferable. If the force exerted by an energy absorbing device (such as that described with reference to FIG. 17) is substantially constant over the distance, it should lie between 1,000–2,000 lbf, preferably 1,500 lbf calculated with respect to a 30 mph barrier impact. The pad may be mounted in contact or slightly spaced from the chest of user, but it must be close to the users chest to be fully effective.

What we claim is:

1. In a vehicle having a seat for an occupant, safety apparatus for restraining movement of said occupant caused by said vehicle, said apparatus comprising:
   a. mounting means fixed alongside said seat,
   b. a rigid arm pivotally supported by said mounting means, said arm having a free end portion extending across said seat for arcuate movement relative thereto,
   c. restraining means fixed to the free end portion of said arm for acting against the chest of said occupant,
   d. means for lightly biasing said restraining means towards said occupant's chest, and
   e. means for automatically locking said arm when said occupant is subjected to sudden movement caused by said vehicle, said arm being movable by said occupant against said light bias except when said arm is locked.

2. Safety apparatus according to claim 1 including recoiless energy absorption means for exerting a retarding force on said arm when locked.

3. Safety apparatus according to claim 1 including collapsible means coupled to said arm, said collapsible means having a compressional resistance for retarding said arm when said occupant exerts a force thereon because of said sudden movement.

4. Safety apparatus according to claim 1 in which said automatic locking means comprises a mass which moves, due to its inertia when said vehicle exerts said sudden movement, to cause said arm to be locked.

5. Safety apparatus according to claim 1 wherein said automatic locking means comprises a toothed member coupled to said arm, a locking pawl having teeth for engaging said toothed member and means for causing relative movement between said pawl and said toothed member to cause locking engagement therebetween when said sudden movement is caused by said vehicle.

6. Safety apparatus according to claim 1 including means for securing said arm in an inoperative position in which said restraining means is spaced from said occupant's chest and means for releasing said arm from said securing means whereupon said arm is lightly biased against said occupant's chest.

7. In a vehicle having a seat for an occupant, safety apparatus for restraining movement of said occupant caused by said vehicle, said apparatus comprising:
   a. mounting means fixed alongside said seat,
   b. a rigid arm pivotally supported by said mounting means, said arm having a free end portion extending across said seat for arcuate movement relative thereto,
   c. restraining means fixed to the free end portion of said arm for acting against the chest of said occupant,
   d. means for lightly biasing said restraining means towards said occupant's chest,
   e. means for automatically locking said arm when said occupant is subjected to sudden movement caused by said vehicle, said arm being movable by said occupant against said light bias except when said arm is locked, and
   f. frictional braking means coupled to said arm for exerting a retarding force on said occupant when said arm is locked.

8. Safety apparatus according to claim 7 wherein said frictional braking means comprises a pair of brake pads spaced by a member which is driven by said arm when locked.

9. Safety apparatus according to claim 8 wherein said member is shaped so as to increase the retarding force exerted thereon by said brake pads when said locked arm moves arcuately.

10. Safety apparatus according to claim 9 wherein said member is mounted on, and extends radially from, said pivotal support, the thickness of said member increasing along a path of movement between said brake pads whereby said increased retarding force is exerted.

11. Safety apparatus according to claim 10 wherein said automatic locking means is mounted on said member.

12. Safety apparatus according to claim 11 wherein a toothed element is fixed to said arm and said automatic locking means comprises a locking pawl having teeth to engage said toothed element and means for causing relative movement between said pawl and said toothed element to cause locking engagement therebetween when said sudden movement is caused by said vehicle.

13. Safety apparatus according to claim 12 wherein said means for causing relative movement comprises a weight attached to said pawl, said weight being located so as to pivot said pawl to cause said locking engagement when said sudden movement is caused by said vehicle.

14. In a vehicle having a seat for an occupant, safety apparatus for restraining movement of said occupant caused by said vehicle, said apparatus comprising:
  a. mounting means fixed alongisde said seat,
  b. a rigid arm pivotally supported by said mounting means, said arm having a free end portion extending across said seat for arcuate movement relative thereto.
  c. restraining means fixed to the free end portion of said arm for acting against the chest of said occupant,
  d. means for lightly biasing said restraining means towards said occupant's chest,
  e. means for automatically locking said arm when said occupant is subjected to sudden movement caused by said vehicle, said arm being movable by said occupant against said light bias except when said arm is locked, said automatic locking means comprising a toothed member driven by said arm, a locking pawl having teeth for engaging said toothed member and means for causing relative movement between said pawl and said toothed member to cause locking engagement therebetween when said sudden movement is caused by said vehicle, and
  f. a collapsible sleeve coupled between said automatic locking means and said arm for exerting a retarding force on said occupant when said arm is locked.

15. Safety apparatus according to claim 14 wherein said biasing means comprises a self-retracting linkage, said toothed member being driven by said linkage and said arm being coupled to said linkage.

16. Safety apparatus according to claim 14 including means for securing said arm in an inoperative position in which said restraining means is spaced from said occupant's chest and means for releasing said arm from said securing means whereby said restraining means is lightly biased against said occupant's chest.

17. Safety apparatus according to claim 16 in which said securing means comprises a solenoid operated latch and said releasing means comprises a switch actuated in response to energization of an ignition circuit of the vehicle.

18. Safety apparatus according to claim 15 wherein said arm is cranked and said restraining means is a pad fixed to said free end portion.

19. Safety apparatus according to claim 18 wherein the base of said pad is of increased width for acting against the abdomen and thighs of said occupant to improve said restraint particularly in a vehicle rollover.

* * * * *